(12) United States Patent
Berton et al.

(10) Patent No.: US 6,858,117 B2
(45) Date of Patent: Feb. 22, 2005

(54) CATHODIC PROTECTION DEVICE FOR FLEXIBLE PIPES

(75) Inventors: Hugues Berton, La Mailleraye sur Seine (FR); Jean-Loc Streiff, Mont Pleasant, WA (US)

(73) Assignee: CoflexIP (FR)

( * ) Notice: Subject to any disclaimer, the term of this patent is extended or adjusted under 35 U.S.C. 154(b) by 328 days.

(21) Appl. No.: 10/088,944

(22) PCT Filed: Nov. 5, 2001

(86) PCT No.: PCT/FR01/03402

§ 371 (c)(1),
(2), (4) Date: Mar. 21, 2002

(87) PCT Pub. No.: WO02/39008

PCT Pub. Date: May 16, 2002

(65) Prior Publication Data

US 2003/0140977 A1 Jul. 31, 2003

(30) Foreign Application Priority Data

Nov. 10, 2000 (FR) .......................................... 00/14463

(51) Int. Cl.[7] .............................................. C23F 13/00
(52) U.S. Cl. .............................. 204/196.2; 204/196.23; 204/196.25; 204/196.33; 204/196.34; 204/196.35; 204/196.37
(58) Field of Search .................. 204/196.2, 196.23, 204/196.25, 196.33, 196.34, 196.35, 196.37

(56) References Cited

U.S. PATENT DOCUMENTS

| 3,868,313 | A | | 2/1975 | Gay ........................... 204/196 |
|---|---|---|---|---|
| 3,990,478 | A | | 11/1976 | McFarland ................... 138/103 |
| 4,705,331 | A | * | 11/1987 | Britton ........................ 439/387 |
| 5,289,561 | A | * | 2/1994 | Costa Filho ................. 392/478 |
| 5,458,441 | A | * | 10/1995 | Barry ........................... 405/170 |
| 5,813,439 | A | * | 9/1998 | Herrero et al. .............. 138/134 |
| 6,012,495 | A | * | 1/2000 | Antonsen ..................... 138/131 |
| 6,053,213 | A | * | 4/2000 | Jung et al. ................... 138/130 |
| 6,123,114 | A | | 9/2000 | Maloberti .................... 138/124 |
| 6,142,707 | A | * | 11/2000 | Bass et al. ................... 405/158 |
| 6,238,545 | B1 | * | 5/2001 | Allebach et al. ............ 205/734 |
| 6,264,401 | B1 | * | 7/2001 | Langner et al. ............. 405/169 |
| 6,315,497 | B1 | * | 11/2001 | Wittman et al. ............. 405/158 |
| 6,364,022 | B1 | * | 4/2002 | Kodaissi et al. ............ 166/367 |
| 6,454,897 | B1 | * | 9/2002 | Morand .................. 156/244.13 |
| 6,461,082 | B1 | * | 10/2002 | Smith ....................... 405/211.1 |

OTHER PUBLICATIONS

Specification for Unbonded Flexible Pipe, API Specification 17J First Edition, Dec. 1996, American Petroleum Institute, Effective date: Mar. 1, 1997.

* cited by examiner

*Primary Examiner*—Bruce F. Bell
(74) *Attorney, Agent, or Firm*—Ostrolenk, Faber, Gerb & Soffen, LLP

(57) ABSTRACT

The flexible pipe comprises a plastic sealing sheath and an inner plastic sheath which define an annular space in which structural elements are placed. The structural elements comprising at least one armor ply consisting of metal wires wound helically with a long pitch are in the space. An end fitting is fitted at each end of the flexible pipe. At least one external anode electronically connected to at least one armor ply. The anode is placed in an intermediate region of the flexible pipe distal from the end fittings. A connection means connects the anode to at least one of the metal wires of the said armor ply in the intermediate region.

15 Claims, 5 Drawing Sheets

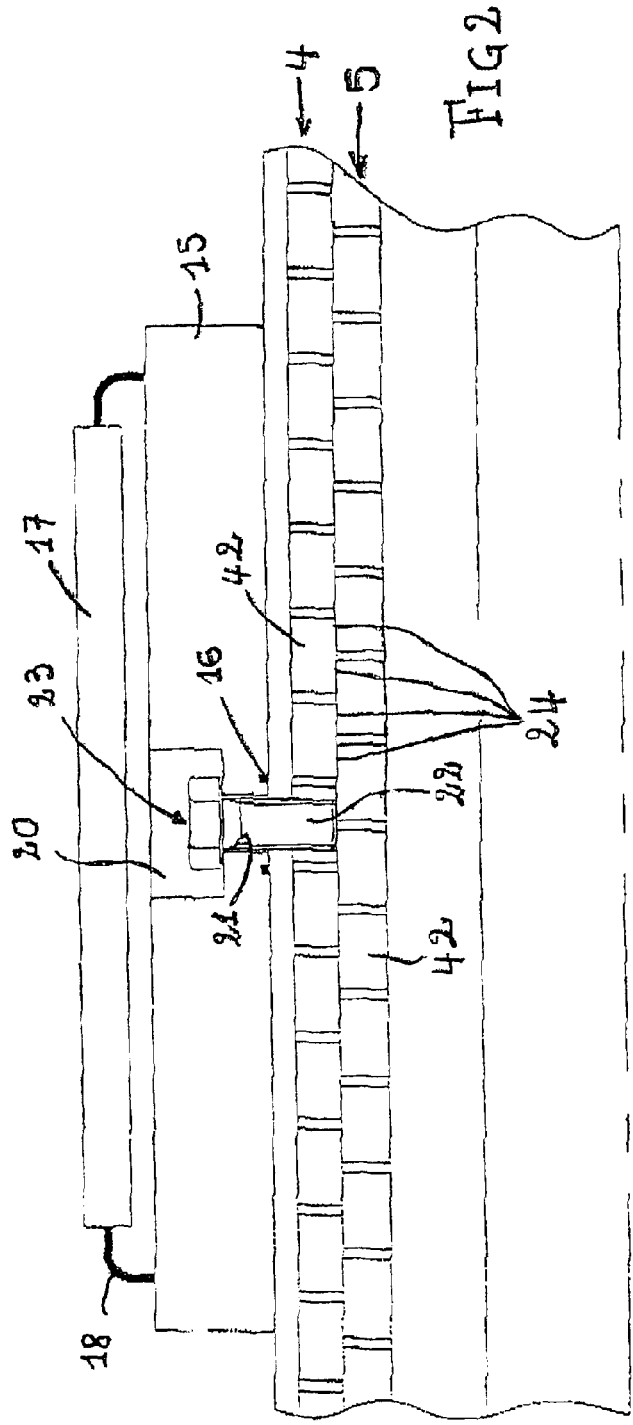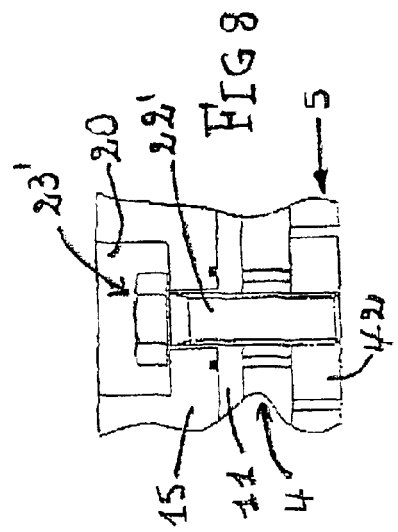

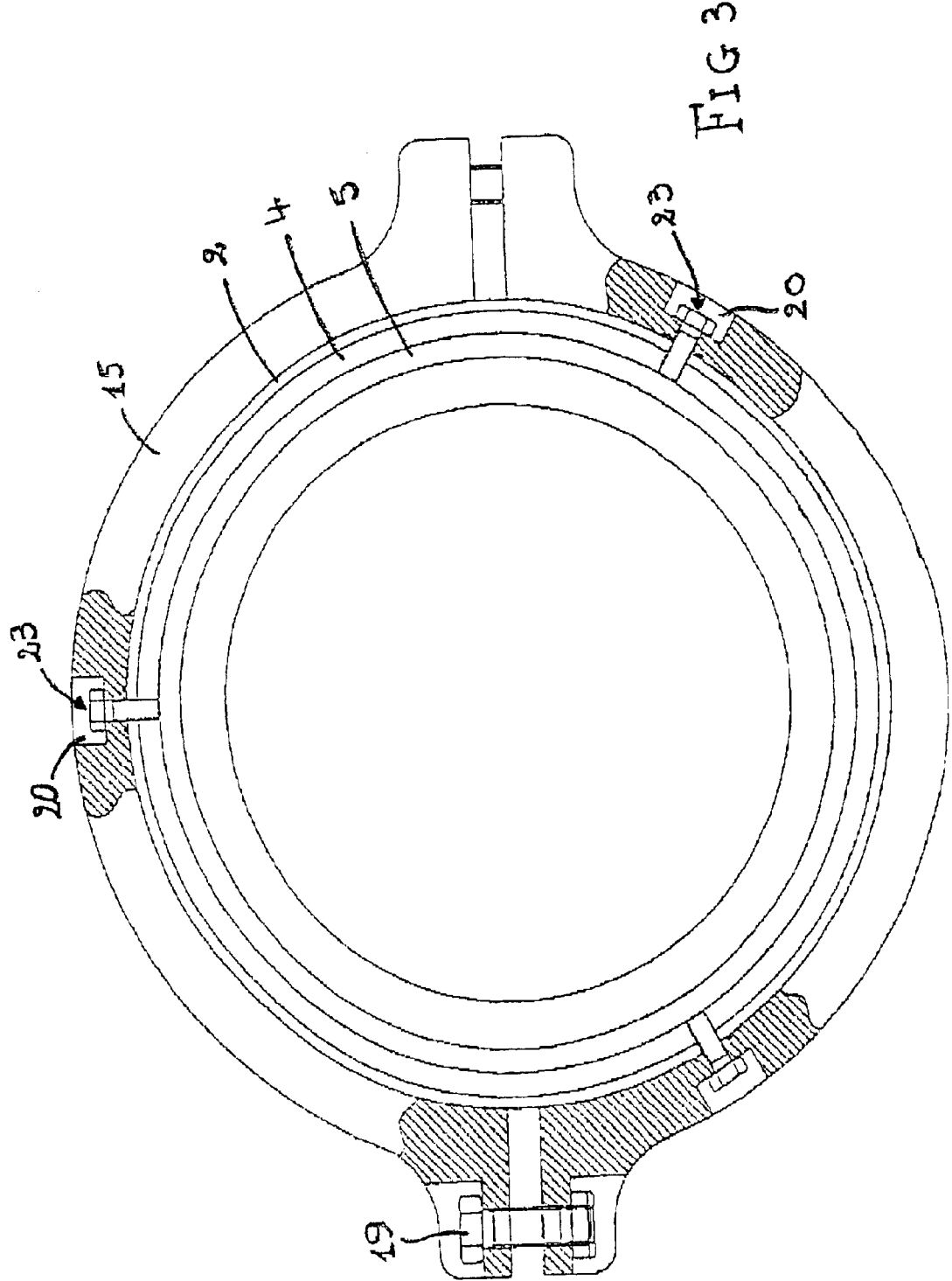

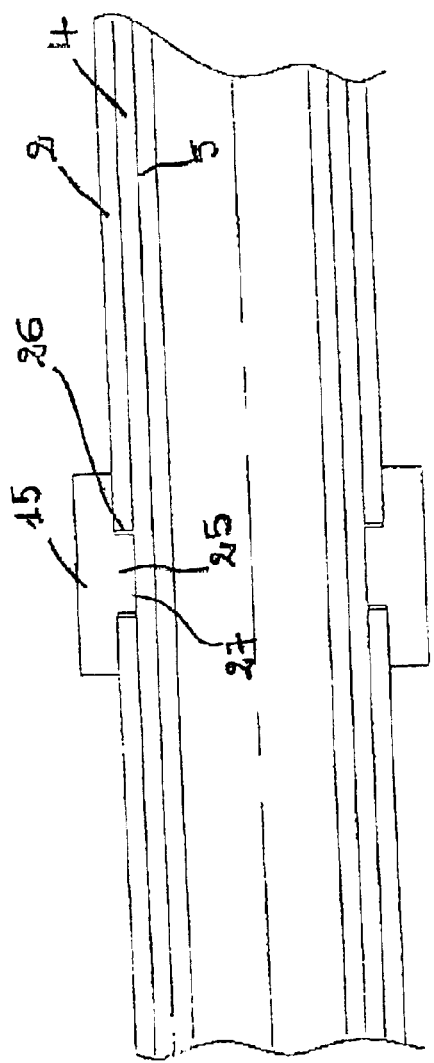
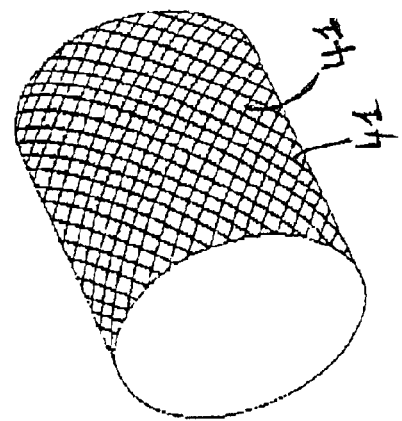

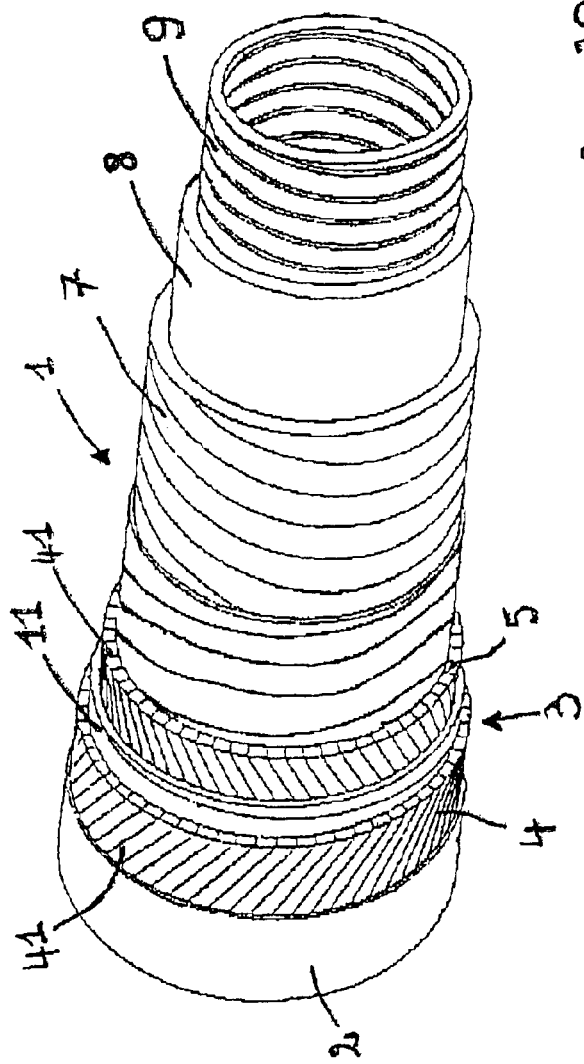
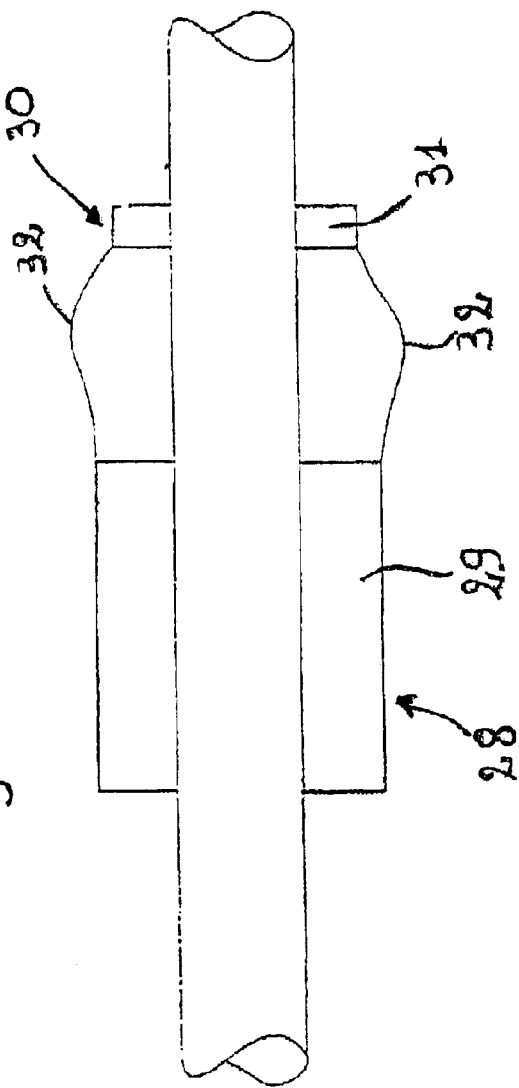

CATHODIC PROTECTION DEVICE FOR FLEXIBLE PIPES

BACKGROUND OF THE INVENTION

The present invention relates to a cathodic protection device for flexible pipes used in the off-shore oil industry and comprising in the outer layers at least one polymeric sealing sheath and a metal structural element such as an armour ply.

Flexible pipes are used to transport crude oil between a wellhead or other underwater system and a floating structure such as a platform.

Flexible pipes generally comprise a polymeric outer sealing sheath and an inner sealing sheath. The annulus, made between these outer and inner sealing sheaths, constitutes a space in which metal structural elements are housed, such as armour plies, a pressure vault, a hoop, etc., depending on the type of flexible pipe used. The various types of flexible pipe are described and shown in API (American Petroleum Institute) 17J.

When the outer sealing sheath of a flexible pipe which is immersed in seawater becomes damaged for whatever reason, part of the immediately adjacent metal element, generally an armour ply consisting of a helical winding of a certain number of metal wires about the longitudinal axis of the said flexible pipe, is exposed to and in contact with the seawater, the area of armour ply thus exposed depending on the size of the tear created in the outer sheath.

Contact with seawater causes corrosion, which may propagate over the entire length of the flexible pipe.

To prevent corrosion of the metal elements of the flexible pipe, due to penetration of seawater into the annulus, the means most often used is in the field. Cathodic protection consists in that called "cathodic protection", well known to experts creating an electrochemical cell so as to reduce the immunity potential.

This is because each metal has a reference potential, called corrosion potential, with respect to the aqueous medium, which potential varies according to the level of corrosion. The greater the corrosion, the higher the potential of the metal with respect to the reference potential. Conversely, the smaller the corrosion, the lower the potential of the metal with respect to the reference potential.

In the case of flexible pipes containing steel, the reference potential of the steel is −440 mV and the immunity potential is −850 mV.

As long as the metallic region of a flexible pipe in contact with the seawater has a potential below −850 mV, the reactions are essentially cathodic and the said region does not corrode. To provide cathodic protection, the steel to be protected is brought into electrical contact with a less noble metal, which has a lower reference potential, such as that of aluminium which is −1100 mV, this less noble metal acting as an anode while the steel region to be protected acts as a cathode. At the point of contact, the steel will have the potential of the anode, this potential gradually increasing on moving away from the anode, this being due to the resistance of the structural metal elements of the flexible pipe to be protected and to the exchange current density.

The current density depends on the cross section of the bared region in contact with the seawater or more simply of the hole in the outer sealing sheath. The formula giving the value of the current density as a function of the cross section of the hole is well known to experts.

The number of anodes is determined so that at any point on the flexible pipe between two consecutive anodes, the potential of the steel is always less than −850 mV.

At the present time, the anodes are external and fitted near the end fittings well known to experts, the said end fittings being terminal members of a flexible pipe used for connecting one end of the flexible pipe to a fixed or movable means such as, for example, a wellhead, a manifold, etc., or to another flexible or rigid pipe, or to a coupling member of the floating structure.

In a end fitting, all the armour plies of the flexible pipe are bent and in intimate contact with the metal vault of the end fitting, generally by means of a retention and holding band. A metal cap is placed around the assembly thus produced and constitutes the external part of the end fitting which is watertight, the free space between the cap and the vault of the end fitting being filled with a resin such as ARALDITE. In addition, the protective cap is screwed onto the vault of the said end fitting so that a continuous connection is provided between the cap, the vault and all the armours as recommended by DNV (Det Norske Veritas) RP-B401 (Cathodic protection design). When the flexible pipe is provided with a cathodic protection anode system for protecting the armours from corrosion, a clamp or collar is placed around the flexible pipe at a distance varying between 1 and 15 m from the end fitting. The clamp has a certain length and one or more anodes are fitted around the external periphery of the clamp.

Next, the anode or anodes are connected to the cap of the end fitting by means of a metal braid so that the anode is connected by an electrically conducting connection, especially to the bent armours and to the vault of the end fitting.

For an average cross section of a hole in the outer sheath, it is accepted that the maximum efficiency of an anode is about 2000 m from each side of the said anode. For a pipe such as one resting on the seabed, and called a "flow line", the protected length is at most 4000 m, which means that a end fitting has to be inserted every 4000 m if it is desired to have effective corrosion protection over the entire length of the said flexible pipe. It is usual, in order to reinforce the protection, to fit an anode on each side of the intermediate end fitting and at a short distance from the latter, in the manner indicated above.

SUMMARY OF THE INVENTION

The object of the present invention is to provide cathodic protection of that part of a flexible pipe which is immersed in seawater without the use of intermediate end fittings, so as to reduce the cost of manufacturing and operating a flexible pipe.

The subject of the present invention is a cathodic protection device for a subsea flexible pipe for transporting fluid, the flexible pipe comprising a plastic sealing sheath and an inner plastic sheath which define an annular space in which structural elements are placed, the said structural elements comprising at least one armour ply consisting of metal wires wound helically with a long pitch, a end fitting being fitted at each end of the said flexible pipe, the device comprising at least one external anode electrically connected by connection means to the said armour ply, characterized in that the anode is placed in an intermediate region of the flexible pipe distal from the said end fittings, the connection means connecting the anode to at least one of the metal wires in the said intermediate region.

Contrary to what experts recommend, it has been found that a single electrical contact with a single metal wire is sufficient to ensure continuity of the cathodic protection.

One advantage of the present invention lies in the fact that the anode devices or systems when the flexible pipe has several of them are fitted to the spanning part of the said flexible pipe.

Another advantage lies in the fact that the flexible pipe can be laid much more quickly in the sea, thereby considerably reducing the cost of the laying operations, in particular by tying up the laying barge for a shorter time, and the running cost of the flexible pipe. Of course, this is a real advantage with reference to a flexible pipe comprising one or more intermediate end fittings and not to a flexible pipe having no intermediate end fittings.

BRIEF DESCRIPTION OF THE DRAWINGS

Further advantages and features will be apparent from reading the description of several embodiments of the anode according to the invention and from the appended drawings in which:

FIG. 2 is a partial schematic sectional view of a portion of flexible pipe provided with a device according to the invention;

FIG. 3 is a sectional view of a clamp or collar fitted on a flexible pipe;

FIG. 4 is a longitudinal, partial and schematic sectional view of another embodiment of the clamp or collar used in the device according to the invention;

FIG. 5 is a partial schematic side view of another embodiment of the device according to the invention;

FIG. 6 is a partial schematic perspective view of two armour windings contained in a flexible pipe;

FIG. 7 is a partial perspective view of one type of flexible pipe; and

FIG. 8 is a schematic sectional view of the connection means when the flexible pipe includes an insulating tape.

DESCRIPTION OF PREFERRED EMBODIMENTS

Figure 1:
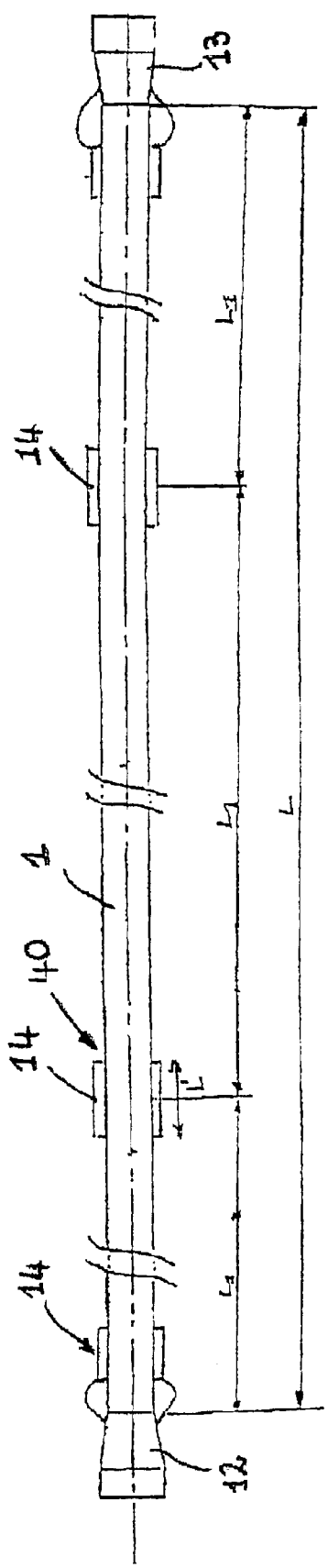
FIG. 1 is a schematic plan view of a long flexible pipe provided at each end with a end fitting and with devices according to the invention.

In the oil industry and especially in offshore oil production, several types of flexible pipe may be used and these are described and shown in API (American Petroleum Institute) 17J. The flexible pipes are called "smooth bore" when the innermost element consists of a polymeric sheath, and "rough bore" when the innermost element consists of a metal carcass.

Whatever the type of flexible pipe, it comprises at least two armour plies, each consisting of metal wires wound helically with a long pitch and a small lay angle about the longitudinal axis of the flexible pipe, the two armour plies being crossed or wound in opposite directions. The metal wires 41 of each armour ply are generally in localized contact with each other at various points. Of course, the flexible pipe may comprise more than two armour plies, the result being that the winding of the wires constituting the armours produces thousands of points of contact between two consecutive armour plies, as shown schematically in FIG. 6. In the example shown in FIG. 7, the flexible pipe 1 comprises, from the outside inwards:

an outer sealed polymeric sheath 2 which is exposed to seawater and/or in contact with the seabed when the flexible pipe is submerged in the sea;

a group 3 of tensile armour plies comprising two armour plies 4 and 5 wound crosswise or in opposite directions with the same lay angle;

a pressure vault 7;

an inner polymeric sealing sheath 8; and a metal carcass 9 consisting of a winding with a short pitch close to 90°.

Very often, an antifriction tape 11 is placed between two consecutive armours and wound with a short pitch about the longitudinal axis of the flexible pipe.

The two, inner and outer, sealing sheaths define an annular space in which the structural elements of the flexible pipe are placed. In the case of FIG. 7, the structural elements consist of the tensile armour plies 4 and 5 and the pressure vault 7.

The device according to the invention is intended to be fitted on the spanning length of the flexible pipe, as shown in FIG. 1. The expression "spanning length" is understood to mean the intermediate regions 40 of the flexible pipe which are relatively far from the end fittings 12 and 13 of the flexible pipe. The position of the intermediate regions 40 is referred to as being distal from the end fittings 12 or 13 of the flexible pipe. In the example shown in FIG. 1, the flexible pipe has a length L of more than 6 kilometers, thereby requiring the use of two devices according to the invention, each being referenced in its entirety by 14. An intermediate region 40 in the present context is defined by that portion of flexible pipe surrounded by the device 14 plus, on each side of the device, a certain proximal portion of the flexible pipe. For a given length L' of a device 14, the intermediate region is from 4 to 5 times the length L', the regular intervals between the end fittings 12, 13 and the devices 14 being equal to L1, each interval L1 being determined according to the range of a cathodic protection anode system, which range being between 1.5 and 2 km.

The device 14 comprises (FIGS. 2 and 3) a collar 15, which is often called a clamp in this particular technical field and which is mounted tightly and preferably in a sealed manner around the flexible pipe, sealing being able to be achieved by circular or torroidal seals 16, and at least one anode 17 which is fastened to the clamp 15, electrical continuity between the anode 17 and the clamp 15 being provided by conductors 18. The anode 17 is generally in the form of a parallelepiped having a length of between 1 and 5 m. The number of anodes 17 around and on the outside of the clamp is between 1 and 6 depending on the desired corrosion protection, on the nature of the metal used for making the anode, which metal is preferably aluminium, zinc, etc., the metal used having to have a reference potential lower than the immunity potential of the steel of the armours 4, 5, and on the lifetime of the cathodic protection of the flexible pipe, which is of the order of 20 years. In the foregoing, when an anode system is referred to, this means that the protection device comprises one or more anodes fastened to the support clamp.

The clamp 15 consists of two semicircular clamping members which are joined together, around the flexible pipe, by bolts 19. The clamp 15 includes, preferably at regular intervals, recesses 20 and through-passages 21 for the insertion of shanks 22 of bolts 23, each bolt shank 22 being screwed into or in contact with at least one metal wire of the first tensile armour 4 located immediately beneath the outer sealing sheath 2 of the flexible pipe. In this way, and as long as the clamp is made of metal, there is sure to be an electrical connection between the anode system 17 fastened to the clamp 15 and all the metal wires of the first tensile armour ply 4. In FIG. 2, the metal tensile armours are shown in the form of small rectangles 42 which are assumed to be similar to the turns 41 of the armours. Since the turns of an armour are in local mutual contact at various points, and with the turns of the other armour ply which follows, thousands of points of contact 24 are obtained between the two armour plies 4 and 5. Consequently, electrical continuity is provided over the entire length of the flexible pipe under the influence of the said anode. Thus, the cathodic protection of the tensile armours is provided over their entire useful length.

In certain cases, the bolt shank 22 is not screwed into the armour but welded, brazed or adhesively bonded to the armour 4, the end result being that electrical continuity is provided between the anode or anodes 17 and the first armour 4.

In another embodiment of the invention, shown in FIG. 4, each half-clamp 15 comprises a penetrating part 25 which is housed in a notch 26 made in the outer sealing sheath 2, the lower end 27 of the part 25 coming into contact with the first metal armour 4. Sealing between the notch 26 and the external medium is provided by known means effective for preventing the ingress of seawater into the flexible pipe.

In another embodiment of the invention, the device is made in two separate parts (FIG. 5). The first part 28 consists of a relatively long clamp 29 and one or more anodes (not shown) fastened to the said clamp 29. The clamp 29 is used only to support the anode or anodes and does not provide electrical continuity with the armour 4. The second part 30 consists of a small collar or clamp 31 which is electrically connected to the clamp 29 by conductors 32. It is the clamp 31 which includes the means for contacting with the armour 4. These means may be bolts similar to the bolts 23, penetrating parts 25 like those in FIG. 4, or as bolt shanks soldered, brazed or adhesively bonded to at least one metal wire of the said armour.

It should be understood that the region of the flexible pipe on which the clamps 29 and 30 are fitted is an intermediate region within the meaning of the invention, whatever the distance separating the two clamps 29 and 30. In practice, this distance, of the same order of magnitude as the anodes, is approximately 1 to 5 m.

In the type of flexible pipe shown in FIG. 7, the two armours 4 and 5 are separated by an antifriction tape 11. If it were sufficient for there to be electrical contact between the anode and the first armour 4, the second armour ply 5 would no longer be protected since the antifriction tape 11 is insulating. To remedy this, use is made (FIG. 8) of a bolt 23' having a longer shank 22' which passes through the first armour 4 and the antifriction tape 11 so as to come into contact with the second armour 5. Consequently, the anode or anodes are electrically connected to the first armour 4 via the shank part that passes through it, for example by screwing, and to the second armour 5 via the lower end of the shank 22', which may also be screwed, welded, brazed or adhesively bonded to the said armour 5.

If the clamps 15, 29 or 31 are not made of metal, it will be necessary to provide electrical connection or continuity between the anode or anodes fitted to the clamp and the first or second tensile armour 4 or 5, depending on whether or not the flexible pipe includes an antifriction tape.

In the embodiment shown in FIG. 5, the clamp 29 may not be made of metal and the clamp 31 may be made of an electrically conducting metal. Conduction between the anode or anodes and the armour in question will then be provided by the conductors 32 and the contacting means provided in the clamp 31.

What is claimed is:

1. Cathodic protection device for a subsea flexible pipe for transporting fluid, the flexible pipe comprising an outer plastic sealing sheath and an inner plastic sheath inward of the outer sheath, the sheaths define an annular space between the outer and inner sheaths;

an end fitting fitted at each end of the flexible pipe; the pipe having an intermediate region distal from the end fittings;

structural elements placed in the annular space, the structural elements comprising at least one armor ply of metal wires wound helically with a long pitch;

the device comprising at least one external anode, the anode being placed in the intermediate region; and a connection means electrically connecting the anode to at least one of the armor ply metal wires in the intermediate region of the flexible pipe distal from the end fittings.

2. Cathodic protection device according to claim 1, wherein the armour ply connected to the anode is adjacent to the outer plastic sealing sheath.

3. Device according to claim 1, wherein the flexible pipe comprises several of the armor plies and wherein the anode is electrically connected to at least one metal wire of each armor ply.

4. Device according to claim 1, wherein the connection means comprises at least one penetrating metal shank which is in contact with the armor ply metal wire or wires which are to be connected to the anode.

5. Device according to claim 1, further comprising a clamp which is clamped around the flexible pipe, and the anode is fastened to the clamp.

6. Device according to claim 5, wherein the clamp comprises a penetrating internal part which is in contact with the armor ply metal wire or wires which are to be connected to the anode.

7. Device according to claim 5, wherein the clamp comprises several penetrating bolts uniformly distributed around the periphery of the flexible pipe and each defining one of the connection means.

8. Device according to claim 7, wherein each bolt has a lower end, and contact between the lower end of each bolt and one of the armor wires is provided by brazing, welding or adhesive bonding using a conductive adhesive.

9. Device according to claim 5, wherein the clamp is fitted in the intermediate region, a second connection means clamp defining the connection means between the anode and at the at least one metal wire, the second connection means clamp being located near the clamp.

10. Device according to claim 1, wherein at least the outermost armour ply comprises at least one tapped part into which a threaded shank of one of the bolts is inserted by screwing.

11. Device according to claim 1, wherein the flexible pipe comprises several of the armor plies separated by insulating intermediate tapes, the connection means connects the anode to the innermost armor ply lying beneath the insulating tape that is last inward.

12. Device according to claim 11, characterized in that the penetrating connection means provide contact with each armour ply of the flexible pipe through which they pass.

13. Device according to claim 11, wherein the connection means connects the anode to all of the armor plies.

14. Device according to claim 1, wherein the anode is of a metal having a reference potential lower than the immunity potential of the armor wires.

15. Device according to claim 14, wherein the armor plies are of steel and the anode is of aluminum or zinc.

* * * * *

UNITED STATES PATENT AND TRADEMARK OFFICE
CERTIFICATE OF CORRECTION

PATENT NO. : 6,858,117 B2
DATED : February 22, 2005
INVENTOR(S) : Berton Hughes et al.

It is certified that error appears in the above-identified patent and that said Letters Patent is hereby corrected as shown below:

<u>Title page,</u>
Item [75], Inventors, should read -- Hugues Berton, La Mailleraye sur Sciene (FR); Jean-Luc Streiff, Mont Pleasant, WA (US) --.
Item [73], Assignee, should read -- Coflexip (FR) --.

Signed and Sealed this

Thirty-first Day of May, 2005

JON W. DUDAS
*Director of the United States Patent and Trademark Office*